(12) United States Patent
Cheng et al.

(10) Patent No.: US 12,521,653 B2
(45) Date of Patent: Jan. 13, 2026

(54) FILTER DEVICE

(71) Applicant: ZHEJIANG WEITAI AUTOMOBILE PARTS CO., LTD., Huzhou (CN)

(72) Inventors: Jianbin Cheng, Huzhou (CN); Yu Zhang, Huzhou (CN); Qinglin Deng, Huzhou (CN); Xiaowei Ying, Huzhou (CN); Xu Chen, Huzhou (CN)

(73) Assignee: ZHEJIANG WEITAI AUTOMOBILE PARTS CO., LTD., Huzhou (CN)

( * ) Notice: Subject to any disclaimer, the term of this patent is extended or adjusted under 35 U.S.C. 154(b) by 573 days.

(21) Appl. No.: 17/957,157

(22) Filed: Sep. 30, 2022

(65) Prior Publication Data
US 2023/0330567 A1   Oct. 19, 2023

(30) Foreign Application Priority Data
Apr. 14, 2022 (CN) .......................... 202210390393.6

(51) Int. Cl.
| | | |
|---|---|---|
| *B01D 29/23* | (2006.01) | |
| *B01D 17/02* | (2006.01) | |
| *B01D 35/30* | (2006.01) | |
| *F02M 37/34* | (2019.01) | |

(52) U.S. Cl.
CPC .............. *B01D 29/23* (2013.01); *B01D 17/02* (2013.01); *B01D 35/30* (2013.01); *F02M 37/34* (2019.01); *B01D 2201/0415* (2013.01); *B01D 2201/303* (2013.01)

(58) Field of Classification Search
CPC ........ B01D 29/23; B01D 17/02; B01D 35/30; B01D 2201/0415; B01D 2201/303; B01D 17/0202; B01D 17/085; B01D 17/10; B01D 29/21; B01D 36/003; B01D 36/005; B01D 36/006; F02M 37/34; F02M 37/24; F02M 37/32
USPC ......... 210/232, 252, 314, 335, 416.4, 416.5, 210/455, 483–485, 489, 493.2, 495, 210/DIG. 5
See application file for complete search history.

(56) References Cited

U.S. PATENT DOCUMENTS

| | | |
|---|---|---|
| 10,253,738 B2 | 4/2019 | Da Costa et al. |
| 2011/0062072 A1* | 3/2011 | Lucas .................... B01D 29/58 |
| | | 210/337 |
| 2017/0067426 A1* | 3/2017 | Da Costa ............. B01D 36/003 |

* cited by examiner

*Primary Examiner* — Madeline Gonzalez
(74) *Attorney, Agent, or Firm* — Ladas & Parry LLP

(57) ABSTRACT

The present application discloses a filter device, including a housing, a primary filter body, and a secondary filter body. The housing is formed with a first channel for fuel to flow in. The primary filter body includes a support fence, a particulate filter medium, and end covers. The secondary filter body is formed with a second channel for the fuel to flow out from the secondary filter body and is configured to block water and allow the fuel to pass. The filter device in the present invention can make it possible to arrange more particulate filter media in a limited space, thereby improving the filtration capacity of a filter element per unit volume.

7 Claims, 13 Drawing Sheets

FILTER DEVICE

CROSS-REFERENCE TO RELATED APPLICATION

This application claims priority to Chinese Patent Application No. 202210390393.6, filed on Apr. 15, 2022, the disclosures of which is hereby incorporated by reference in its entirety.

FIELD OF TECHNOLOGY

The present application relates to the technical field of fuel filtration, in particular to a filter device for a fuel supply system of an internal combustion engine.

BACKGROUND

Water and particulate impurities in fuel are extremely harmful to a fuel supply system of an internal combustion engine, in which the presence of water will lead to poor lubrication and wear and corrosion of a fuel injector and a high-pressure pump; and the particulate impurities (such as dust, metal powder, etc.) will accelerate wear of the high-pressure pump and cause blockage of the fuel injector.

In general, a fuel filter with a fuel-water separation function is arranged in a fuel supply system to clean fuel so as to remove water and particulate impurities in the fuel. With the progress of technology, the development of internal combustion engines towards high efficiency and energy conservation requires filters to meet lightweight design and have higher filtration performance and longer service life.

At present, most of fuel filters adopt cylindrical filters for filtration. A particle filter is arranged in a tubular housing, and a water separator is concentrically and directionally arranged in the center of the tubular housing with respect to a filter medium in general. Before fuel is delivered to an engine, the particulate filter and the water separator reduce particulates and water in the fuel. However, the space cannot be effectively fully utilized in flat and narrow space layout of a vehicle by using such cylindrical filter, and the filter size is relatively small in general, so it is difficult to meet the performance requirements of modern engine fuel filters on long life and efficient filtration.

In the prior art, U.S. Pat. No. 10,253,738B2 discloses a filter assembly for filtering diesel fuel used in a diesel engine, the filter assembly is in the shape of a relatively flat cuboid structure, and fuel is filtered by means of one side surface of a cuboid. In a filter similar to the design of this solution, filter media for filtration are not arranged on other surfaces of a cuboid, such that the filtration area is not maximized in a limited space. It is known from fluid mechanics and filtration knowledge that the flow rate per unit area and resistance of fuel passing through the filter media have a strong negative correlation with the filtration area. Under the condition of a certain fuel flow, the reduction of the filtration area will increase the flow rate per unit area and the flow resistance. The increase of the flow rate per unit area and the flow resistance directly reduces the filtration capacity of the filter, and the reduction of the filtration area will reduce the impurity intercepting and accommodating capacity and fuel-water separation efficiency of the filter. Therefore, it is difficult to substantially improve and prolong the filtration performance and service life of the cuboid-shaped filter similar to the design of this solution or filter media with higher performance need to be configured to meet its requirements.

SUMMARY

The present application provides a filter device, and aims to solve the technical problems of poor filtration performance and short service life of a filter element per unit volume.

The above technical objective of the present application is achieved by the technical solution below.

Provided is a filter device, arranged in an external assembly, and including:

a housing formed with a first channel for fuel to flow in and having at least two hollow surfaces;

a primary filter body installed inside the housing, the primary filter body including a support fence, a particulate filter medium sleeved on the periphery of the support fence, and end covers connected to two ends of the particulate filter medium, and being formed with a non-filtering-side contaminant accommodation cavity, the non-filtering-side contaminant accommodation cavity communicating with the first channel, and the primary filter body forming a filtering-side cleaning cavity together with the housing; and a secondary filter body installed on an outer side of the housing and configured to block water and allow the fuel to pass, the secondary filter body being formed with a second channel for the fuel to flow out from the secondary filter body.

Optionally, the housing includes a cover plate and a base, the base is formed with an opening, and the opening is enclosed by the cover plate.

Optionally, the hollow surfaces are arranged on the cover plate and the base; and each of the hollow surfaces is inlaid with and covered by a water gathering medium for gathering the water and filtering out the fuel in the filtering-side cleaning cavity.

Optionally, one end cover of the primary filter body is formed with a fuel passing hole communicating with the first channel.

Optionally, an enclosing manner of the cover plate and the base includes one or a combination of welding, gluing, fastening, and clamping.

Optionally, a buckle is arranged on an edge of the cover plate, the opening of the base is provided with a fastener, and the buckle is correspondingly clamped with the fastener to enclose the cover plate on the base.

Optionally, the support fence is provided with a plurality of transverse ribs that are staggered and spaced.

Optionally, the secondary filter body includes a tubular water blocking medium and a tube frame for fixing the water blocking medium, and the tube frame is installed on an installation clamping piece on one side of the housing.

Optionally, the installation clamping piece is a hoop, and the tube frame is clamped on the hoop.

The present application further provides another filter device, including:

a primary filter body including a support fence and a particulate filter medium sleeved on the periphery of the support fence, an upper cover plate and a lower cover plate being respectively hermetically connected to two sides of the particulate filter medium, a non-filtering-side contaminant accommodation cavity being formed inside the particulate filter medium, the upper cover plate being formed with a first channel for fuel to flow in, and the non-filtering-side contaminant accommodation cavity communicating with the first channel; and a secondary filter body positioned on one side of the primary filter body and configured to block water and allow the fuel to pass, the secondary filter body being formed with a second channel for the fuel to flow out from the secondary filter body.

Optionally, the filter device further includes a water gathering medium sleeved on and covering the periphery of the particulate filter medium and configured to gather the water.

Optionally, two sides of the water gathering medium are respectively hermetically connected to the upper cover plate and the lower cover plate.

Optionally, the two sides of the particulate filter medium are respectively welded with the upper cover plate and the lower cover plate by hot melt; and/or, the two sides of the water gathering medium are respectively welded with the upper cover plate and the lower cover plate by hot melt.

Optionally, the filter device further includes a porous frame sleeved on the periphery of the primary filter body and having an upper side and a lower side respectively connected to the upper cover plate and the lower cover plate.

Optionally, a manner of connecting the porous frame to the upper cover plate and the lower cover plate includes one or more of hot melt welding, gluing, and clamping.

Optionally, hooks are arranged on an edge of the upper cover plate and an edge of the lower cover plate, the porous frame is provided with fittings, and the hooks are correspondingly clamped with the fittings to fix the upper cover plate and the lower cover plate to the porous frame.

Optionally, the support fence is provided with a plurality of transverse ribs that are staggered and spaced.

Optionally, the secondary filter body includes a tubular water blocking medium and a tube frame for fixing the water blocking medium, and the tube frame is installed on an installation clamping piece on one side of the upper cover plate and one side of the lower cover plate.

In the technical solution of the present application, the primary filter body is arranged in the housing with at least two hollow surfaces, and the particulate filter medium thereof is shaped via the support fence and the end covers, such that the primary filter body is formed with the non-filtering-side contaminant accommodation cavity; during filtration, the fuel enters the non-filtering-side contaminant accommodation cavity from the first channel of the housing connected to the outside and enters the filtering-side cleaning cavity after passing through the particulate filter medium to complete the filtration of particulate contaminants of the fuel, then the fine particle water in the fuel is gathered via the water gathering medium inlaid on the hollow surface and enters the secondary filter body, the water is intercepted by means of the water blocking medium and is naturally sedimented in the fuel to complete the separation of the water in the fuel, and finally clean fuel is fed into an injection system for an engine. The filter device in the present application can make it possible to arrange more particulate filter media and water gathering media in a limited space to increase its effective filtration area. The increase of the effective filtration area may reduce the flow rate per unit area of the fuel passing through the filter element and reduce the resistance of the fuel passing through the filter element (reduce energy consumption), such that the efficiency of particulate filtration is improved and more particulate impurities can be accommodated. Meanwhile, the reduction of the flow rate per unit area of the fuel passing through the filter element is conducive to the gathering of the water in the fuel, thereby improving the fuel-water separation efficiency of the filter element, and achieving the effect of improving and prolonging the filtration capacity and service life of the filter element per unit volume.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

IN THE FIGURES

Figure 1:
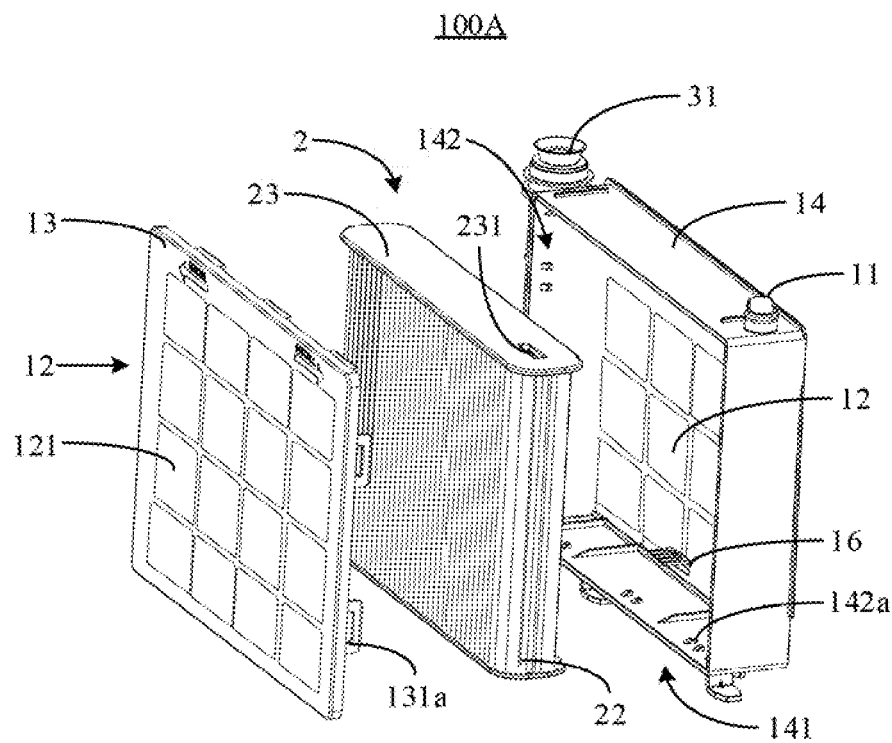
FIG. 1 is an exploded view of an embodiment 100A of a filter device provided by the present application.
Figure 2:
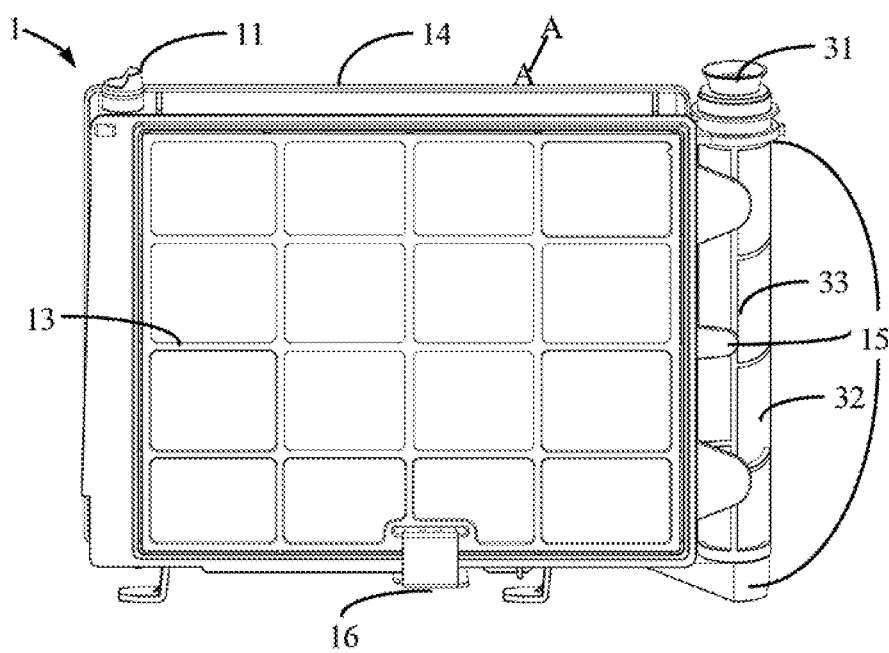
FIG. 2 is a three-dimensional structural diagram of the embodiment 100A of the filter device provided by the present application.

100A: filter device; 1: housing; 11: first channel; 12: hollow surface; 121: water gathering medium; 13: cover plate; 131: buckle; 131a: first clamping leg; 14: base; 141: opening; 142: fastener; 142a: second clamping leg; 15: installation clamping piece; 16: electrical connector; 2: primary filter body; 21: support fence; 211: transverse rib; 212: vertical rib; 22: particulate filter medium; 221: non-filtering side; 222: filtering side; 23: end cover; 231: fuel passing hole; 24: non-filtering-side contaminant accommodation cavity; 25: filtering-side cleaning cavity; 3: secondary filter body; 31: second channel; 32: water blocking medium; and 33: tube frame.

100B: filter device; 4: porous frame; 41: fitting; 42: installation clamping piece; 5: primary filter body; 51: support fence; 511: transverse rib; 512: vertical rib; 52: particulate filter medium; 53: non-filtering-side contaminant accommodation cavity; 54: upper cover plate; 541: first channel; 542: hook; 55: lower cover plate; 6: secondary filter body; 61: second channel; 611: sealing sleeve; 612: fuel passing tube; 62: water blocking medium; 63: tube frame; 7: water gathering medium; and 8: electrical connector.

100C: filter device; 101: particulate filter medium; and 102: water gathering medium.

The objective achievement, functional characteristics, and advantages of the present application will be further illustrated with reference to the accompanying drawings in conjunction with the embodiments.

DETAILED DESCRIPTION

The technical solutions in the embodiments of the present application are clearly and completely described below with reference to the accompanying drawings in the embodiments of the present application. Apparently, the described embodiments are merely a part rather than all of the embodiments of the present application. All other embodiments obtained by those of ordinary skill in the art based on the embodiments of the present application without creative efforts shall fall within the scope of protection of the present application.

In order to better describe and illustrate the embodiments of the present application, one or more accompanying drawings may be referred to, but additional details or examples used to describe the accompanying drawings should not be considered to limit the scope of any one of creations, presently described embodiments, or preferred modes of the present application.

In the description of the present application, it should be noted that the orientational or positional relationships indicated by the terms "length", "width", "upper", "lower", "front", "back", "left", "right", "top". "bottom", "inside", "outside", etc. are based on the positional relationships shown in the accompanying drawings, are only used for the convenience of describing the present application rather than indicating that the referred device must have a specific orientation or be operated in a specific orientation, and therefore should not be construed as a limitation to the present application.

All technical and scientific terms used herein have the same meaning as commonly understood by those skilled in the art of the present application, unless otherwise defined. The terms used in the specification of the present application are only used for describing specific embodiments, and are not intended to limit the present application.

In the prior art, U.S. Pat. No. 10,253,738B2 discloses a filter assembly for filtering diesel fuel used in a diesel engine, the filter assembly is in the shape of a relatively flat cuboid structure, and fuel is filtered by means of one side surface of a cuboid. In a filter similar to the design of this solution, filter media for filtration are not arranged on other surfaces of a cuboid, such that the filtration area is not maximized in a limited space. It is known from fluid mechanics and filtration knowledge that the flow rate per unit area and resistance of fuel passing through the filter media have a strong negative correlation with the filtration area. Under the condition of a certain fuel flow, the reduction of the filtration area will increase the flow rate per unit area and the flow resistance. The increase of the flow rate per unit area and the flow resistance directly reduces the filtration capacity of the filter, and the reduction of the filtration area will reduce the impurity intercepting and accommodating capacity and fuel-water separation efficiency of the filter. Therefore, it is difficult to substantially improve and prolong the filtration performance and service life of the cuboid-shaped filter similar to the design of this solution or filter media with higher performance need to be configured to meet its requirements.

In view of this, the present application provides a filter device. FIGS. 1 to 8 show an embodiment of the filter device provided by the present application. Referring to FIGS. 1 to 8, the filter device 100A includes a housing 1, a primary filter body 2, and a secondary filter body 3.

Specifically, referring to FIG. 1, the housing 1 is square, a surface of the housing 1 is formed with a first channel 11 for fuel to flow into the housing 1, and two side surfaces of the housing 1 are symmetrically arranged hollow surfaces 12; and the primary filter body 2 is installed inside the housing 1, the primary filter body 2 includes a support fence 21, a particulate filter medium 22 sleeved on the periphery of the support fence 21, and end covers 23 connected to two ends of the particulate filter medium 22, and the end covers 23 are configured to seal an opening side of the particulate filter medium 22 to form a non-filtering-side contaminant accommodation cavity 24 inside. In this embodiment, the non-filtering-side contaminant accommodation cavity 24 communicates with the first channel 11 via an opening in a cover plate 13. Moreover, a filtering-side cleaning cavity 25 is formed between the periphery of the primary filter body 2, that is, a filtering side 222 and the housing 1; and the secondary filter body 3 is installed on an outer side of the housing 1 and is configured to block water and allow the fuel to pass, and the secondary filter body 3 is formed with a second channel 31 for the fuel to flow out from the secondary filter body to an engine. It should be noted that the particulate filter medium 22 is filter paper, and the particulate filter medium 22 has an inner side as a non-filtering side 221 and an outer side as a filtering side 222.

Figure 8:
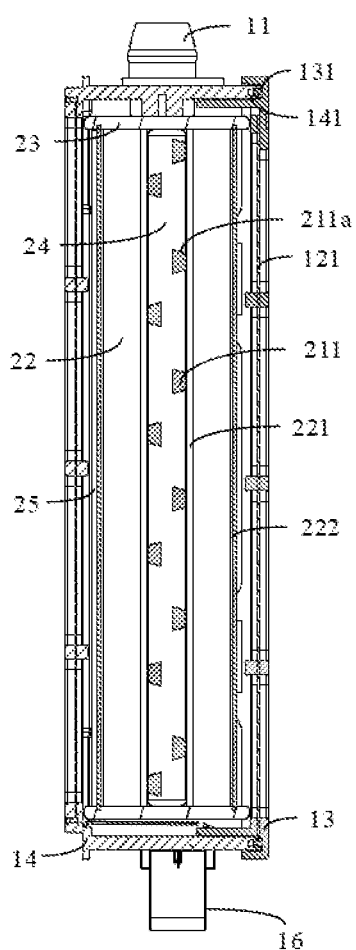
FIG. 8 is a cross-sectional view of a surface A-A in FIG. 2.

During filtration, referring to FIG. 8, the impurity-containing fuel enters the non-filtering-side contaminant accommodation cavity 24 from the first channel 11, is filtered out into the filtering-side cleaning cavity 25 after the impurities are removed via the particulate filter medium 22, and then enters an outer side of the secondary filter body 3 via the hollow surfaces 12, and the fuel is finally pumped into the engine after water blocking. It should be noted that there may be a plurality of hollow surfaces 12 according to the design of the housing 1. In this embodiment, the housing 1 is square and may have at most six hollow surfaces.

In the technical solution of the present application, the primary filter body 2 is arranged in the housing 1 with at least two hollow surfaces, and the particulate filter medium 22 thereof is shaped via the support fence 21 and the end covers 23, such that the primary filter body is formed with the non-filtering-side contaminant accommodation cavity 24 with a plurality of non-filtering sides 221; and during filtration, the fuel enters the filtering-side cleaning cavity 25 from a plurality of filtering sides, then enters the secondary filter body 3 via the hollow surfaces 12, and finally is pumped into the engine.

The filter device in the present application can make it possible to arrange more particulate filter media 22 and water gathering media 121 in a limited space to increase its effective filtration area. The increase of the effective filtration area may reduce the flow rate per unit area of the fuel passing through the filter element and reduce the resistance of the fuel passing through the filter element (reduce energy consumption of fuel pumping), such that the efficiency of particulate filtration is improved and more particulate impurities can be accommodated. Meanwhile, the reduction of the flow rate per unit area of the fuel passing through the filter element is conducive to the gathering of the water in the fuel, thereby improving the fuel-water separation efficiency of the filter element, and achieving the effect of improving and prolonging the filtration capacity and service life of the filter element per unit volume.

In some embodiments of the present application, the housing 1 includes at least one cover plate 13 and a base 14, at least one opening 141 is formed in a side surface of the base 14, the opening 141 is enclosed by the cover 13, and the first channel 11 is formed in the base 14. In this embodiment, one cover plate 13 is arranged, and one opening 141 is correspondingly formed in one side surface of the base 14; and of course, two or more cover plates 13 and two or more openings 141 may also be arranged according to an assembly manner of the housing 1, which will not be repeated in detail here.

Figure 3:
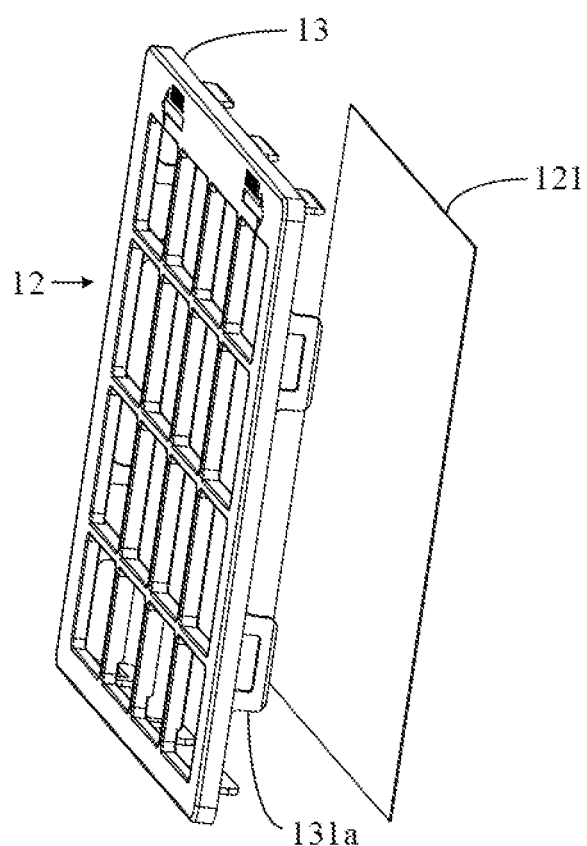
FIG. 3 is a three-dimensional structural diagram of a cover plate and a water gathering medium in FIG. 1.

Referring to FIGS. 1 and 3, the hollow surfaces 12 are respectively arranged on the cover plate 13 and the base 14. In this embodiment, one surface of the cover plate 13 and one surface of the base 14 directly facing the cover plate 13 are the hollow surfaces 12, of course, the housing 1 with a square structure may have at most six hollow surfaces 12, preferably two hollow surfaces in this embodiment: and each of the hollow surfaces 12 is provided with a water gathering medium 121, the water gathering medium 121 covers the hollow surface 12 and encloses a hollow portion of the hollow surface 12, and the water gathering medium 121 can gather the water and sediment it to the bottom of a filter chamber of the assembly and can also filter out the fuel in the filtering-side cleaning cavity 25. It should be noted that the water gathering medium 121 may be made of a non-woven fabric or other materials capable of absorbing the water. The water gathering medium 121 is integrated with the hollow surface 12 by injection molding inlaying and integral forming, welding, or gluing, preferably by means of injection molding inlaying and integral forming, thereby making its structure more compact.

Figure 4:
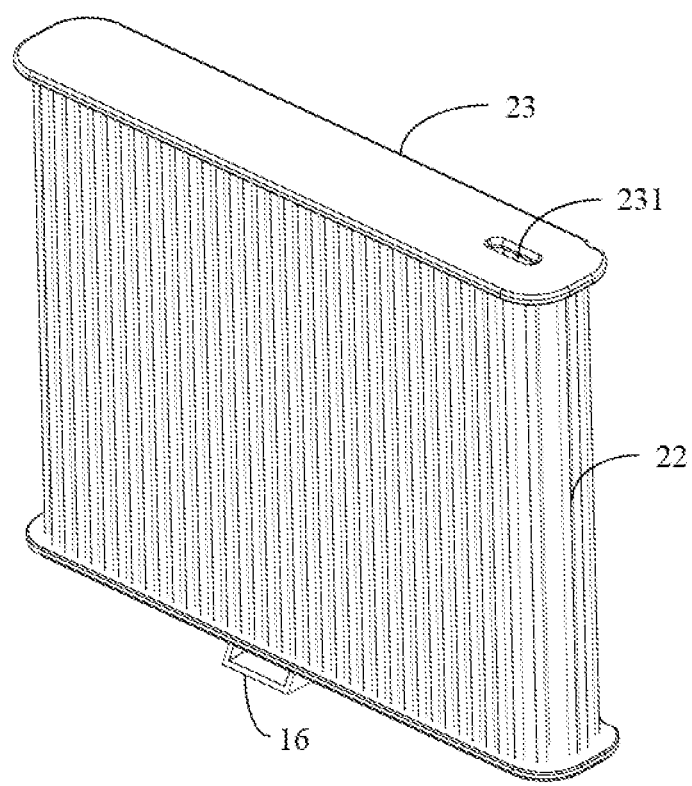
FIG. 4 is a three-dimensional structural diagram of a primary filter body in FIG. 1.

Referring to FIG. 4, one end cover 23 of the primary filter body 2 is formed with a fuel passing hole 231 communicating with the first channel 11, such that the fuel enters the non-filtering-side contaminant accommodation cavity 24 from the fuel passing hole 231.

In some embodiments of the present application, an enclosing manner of the cover plate 13 and the base 14 includes one or a combination of welding, gluing, fastening, and clamping. It should be noted that the cover plate 13 and the base 14 are plastic parts. Preferably, welding may adopt ultrasonic welding.

In some embodiments of the present application, referring to FIGS. 1, 3 and 8, a buckle 131 is arranged on an edge of the cover plate 13, the opening 141 of the base 14 is provided with a fastener 142, and the buckle 131 is correspondingly clamped with the fastener 142 to enclose the cover plate 13 on the base 14. Of course, the buckle 131 and the fastener 142 may be in direct snap fit with each other or ultrasonically welded to achieve sealing, or a sealant or a sealing element is added between the buckle 131 and the fastener 142 to achieve sealing. Referring to FIGS. 1 and 3, in order to increase the connection strength between the cover plate 13 and the base 14, each of the cover plate 13 and the base 14 is provided with a plurality of first clamping legs 131a and second clamping legs 142a for mutual clamping connection. The first clamping legs 131a and the second clamping legs 142a may be arranged on an inner side or an outer side of the base, and at this time internal clamping connection or external clamping connection is formed. Referring to FIG. 1, as the internal clamping connection is preferably adopted, the connection is more reliable and the appearance is more aesthetic. Referring to FIG. 8, two ends of the end cover 23 and two ends of the particulate filter medium 22 may be bonded by means of hot melt welding, gluing, or heating solidification to seal the openings in the two ends thereof. As the hot melt welding is preferably adopted, it has higher production efficiency. In addition, the support fence 21, in the non-filtering-side contaminant accommodation cavity 24, abuts against the end cover 23: and in view of that the particulate filter medium 22 will become soft under long-time soaking to collapse, at this time the support fence 21 may play a supporting role.

Figure 5:
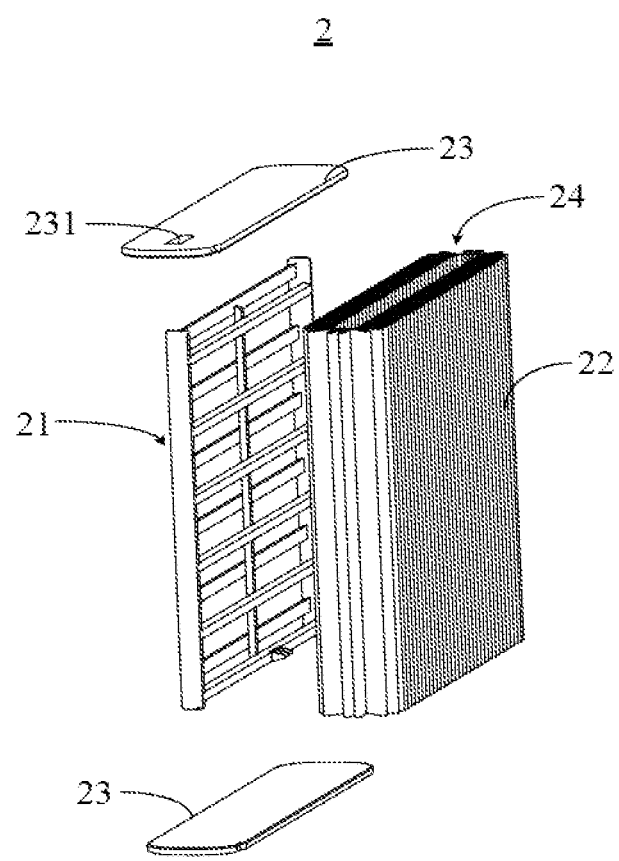
FIG. 5 is an exploded view of the primary filter body in FIG. 1.
Figure 6:
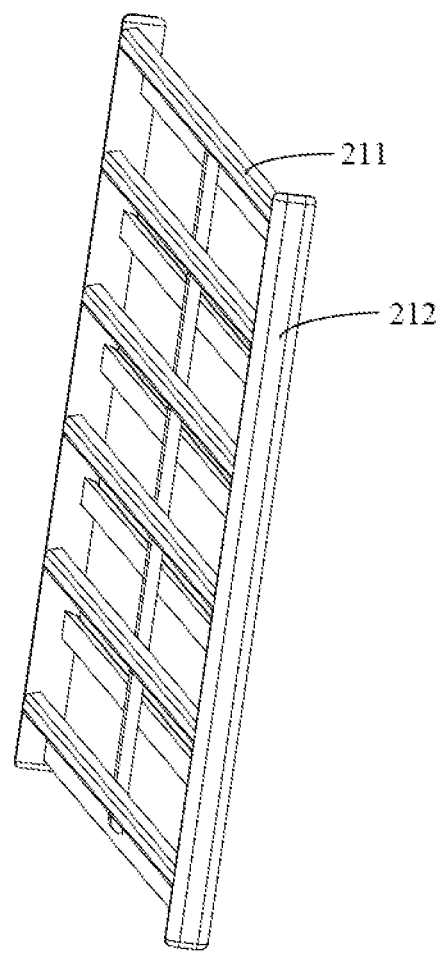
FIG. 6 is a three-dimensional structural diagram of a support fence in FIG. 5.

In an embodiment of the present application, referring to FIG. 5, the support fence 21 is provided with a plurality of transverse ribs 211, and the transverse ribs 211 are staggered and spaced in a vertical direction. In this embodiment, the transverse ribs 211 are parallel to each other and have the same length, and the particulate filter medium 22 is expanded into a flat cuboid structure. Such structure enables the particulate filter medium 22 to have the maximum contact area in the limited non-filtering-side contaminant accommodation cavity 24. It should be noted that the support fence 21 is further provided with a plurality of vertical ribs 212 integrally formed with the transverse ribs 211, and the transverse ribs 211 are staggered and spaced on the vertical ribs 212 to form the support fence 21.

In an embodiment of the present application, referring to FIG. 5, ends of the transverse ribs 211 abut against the particulate filter medium 22 to form the non-filtering-side contaminant accommodation cavity 24. The entered fuel diffuses into the cavity. Of course, the embodiment of the present application is not limited thereto. In other embodiments, the transverse ribs 211 on the support fence 21 may also be intersected with each other, and the particulate filter medium 22 may also be expanded into the cuboid structure.

Figure 7:
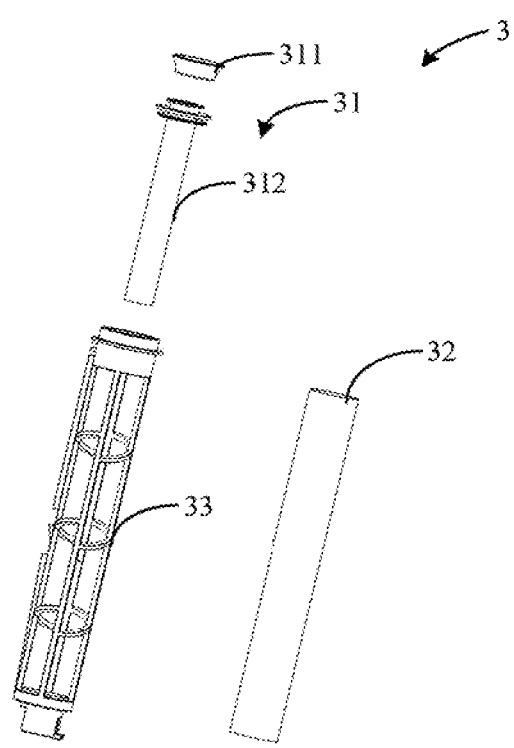
FIG. 7 is an exploded view of a secondary filter body in FIG. 1.

In some embodiments of the present application, referring to FIG. 7, the secondary filter body 3 includes a tubular water blocking medium 32 and a tube frame 33, the water blocking medium 32 is fuel-water separation mesh cloth with characteristics of water repelling and fuel passing, the tube frame 33 and the water blocking medium 32 are integrally injection-molded, an installation clamping piece 15 is arranged on one side of the housing 1, and the tube frame 33 is installed on the installation clamping piece 15. In this embodiment, the installation clamping piece 15 is a hoop. In addition, the second channel 31 communicates with the water blocking medium 32 to feed the water-free fuel into the engine, the second channel 31 includes a sealing sleeve 311 configured to be connected to the outside, and a fuel passing tube 312, the fuel passing tube 312 is arranged inside the water blocking medium 32 and is hermetically connected to the tube frame 33, and the sealing sleeve 311 is buckled to a fuel outlet of the fuel passing tube 312.

It should be noted that the filter device 100A is placed in the filter chamber (not shown in figure) of the assembly and is connected to it by the above first channel 11 and second channel 31, and the fuel is pumped into the engine after flowing out through the non-filtering-side contaminant accommodation cavity 24, the particulate filter medium 22, the filtering-side cleaning cavity 25, the water gathering medium 121, the secondary filter body 3, and the second channel 31 connected to the filter chamber of the assembly in sequence from the first channel 11 connected to the filter chamber of the assembly.

In addition, the filter chamber of the assembly is provided with a ground wire for conducting static electricity and a water level sensor. The ground wire is electrically connected to an electrical connector 16 on the base 14, and the electrical connector 16 is electrically connected to one end cover 23 of the primary filter body 2 to conduct the static electricity generated in the particulate filter medium 22 by the fuel to the outside. Of course, the end cover 23 is made of a conductive material. In addition, the filter chamber of the assembly is further provided with a valve for drainage, and the valve is interlocked with the water level sensor, such that when the water in the fuel is sedimented to a certain height, a drainage alarm is given for drainage.

The present application further provides another filter device arranged in a filter chamber of an assembly. FIGS. 9 to 15 show an embodiment of another filter device provided by the present application. Referring to FIGS. 9 to 15, the filter device 100B includes a primary filter body 5 and a secondary filter body 6.

Figure 9:
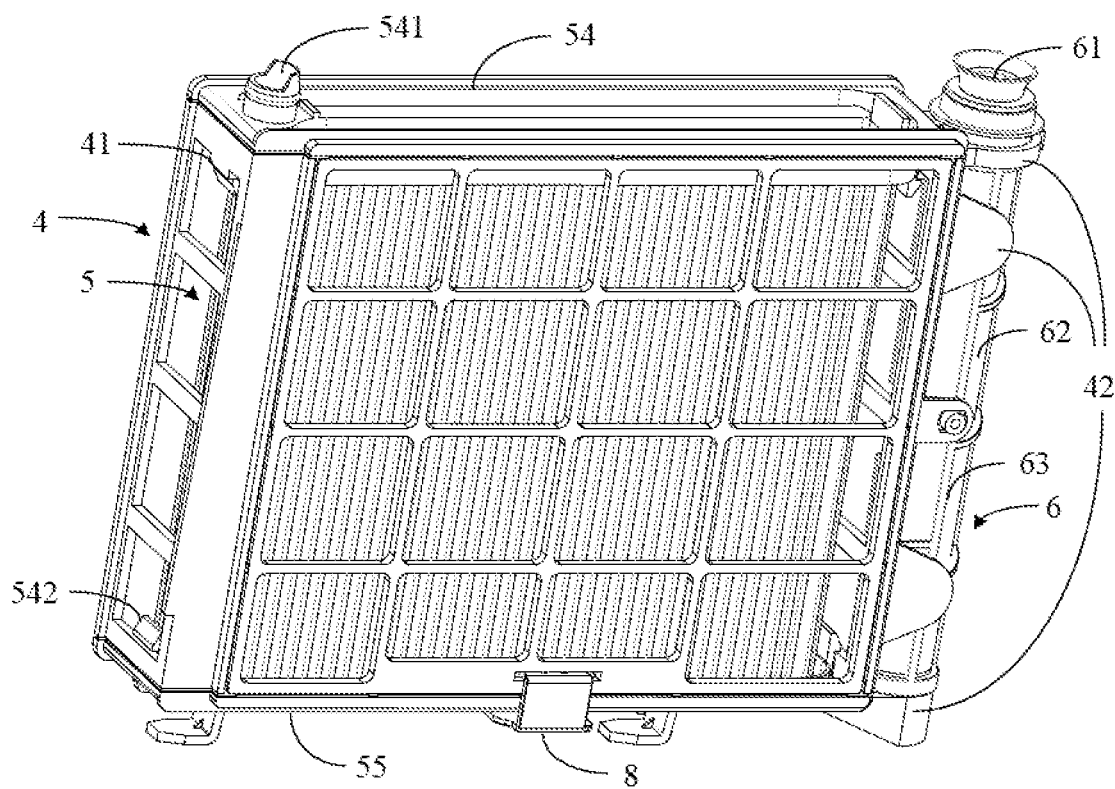
FIG. 9 is a three-dimensional structural diagram of an embodiment 100B of the filter device provided by the present application.
Figure 11:
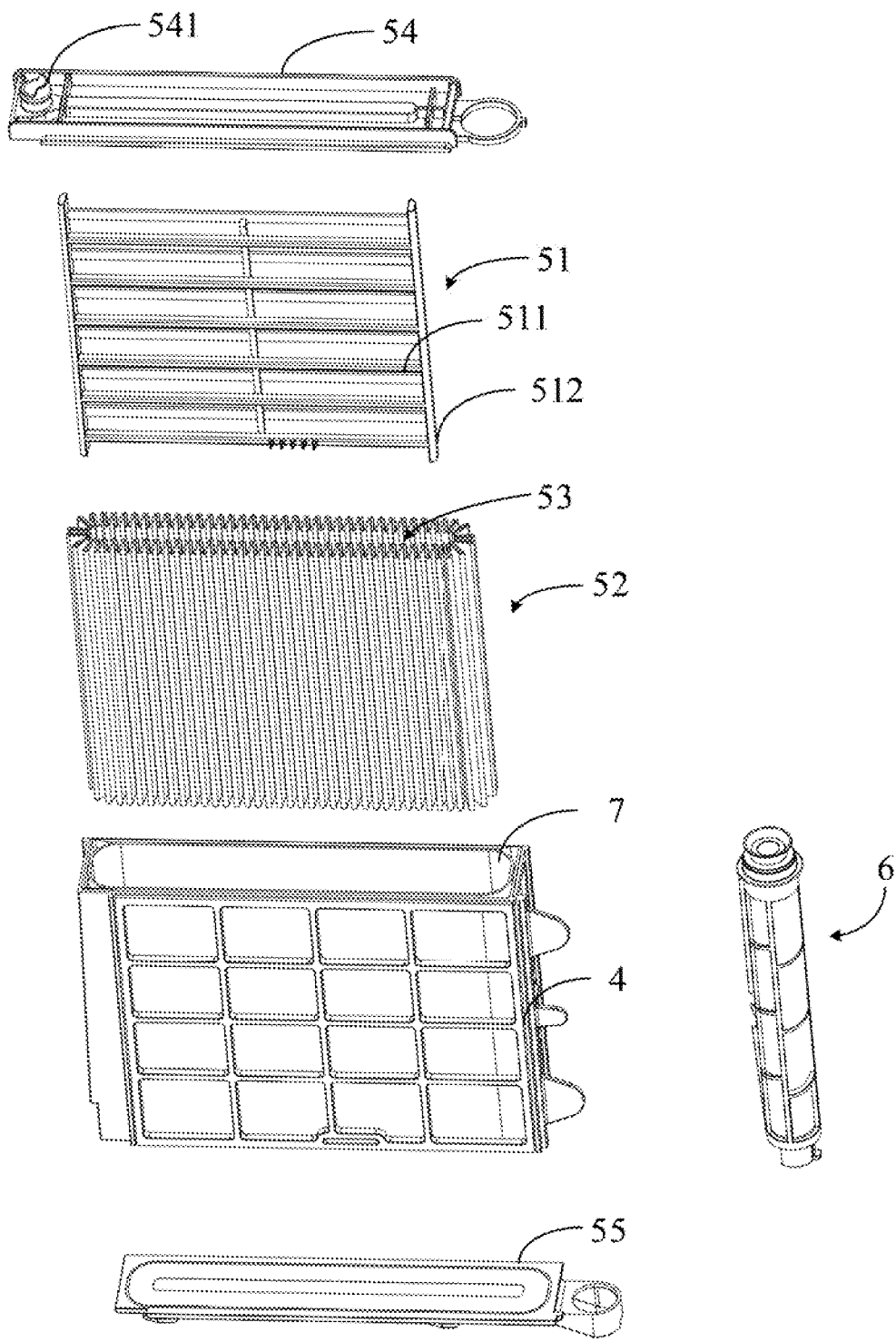
FIG. 11 is an exploded view of the embodiment 100B of the filter device provided by the present application.
Figure 12:
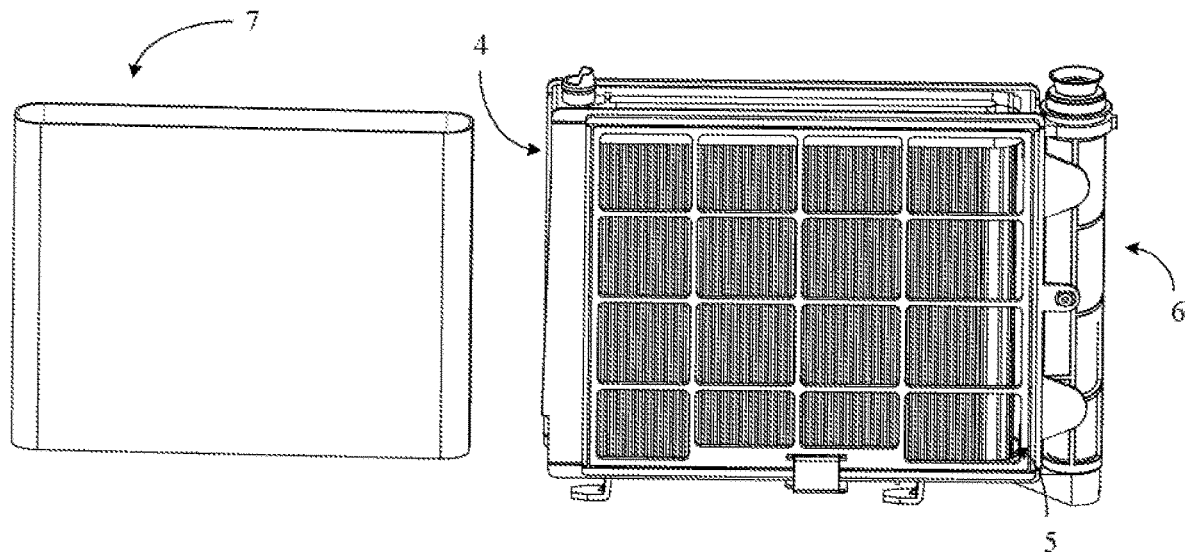
FIG. 12 is an exploded view of a water gathering medium in the embodiment 100B of the filter device provided by the present application.

Referring to FIGS. 9 and 11, a porous frame 4 is arranged on the periphery of the primary filter body 5, and each side surface of the porous frame 4 is designed to be hollow; the primary filter body 5 includes a support fence 51 and a particulate filter medium 52 sleeved on the periphery of the support fence 51, an upper cover plate 54 and a lower cover plate 55 are respectively hermetically connected to two sides of the particulate filter medium 52 to define a flat non-filtering-side contaminant accommodation cavity 53 in the particulate filter medium 52 together with the support fence 51, the upper cover plate 54 is formed with a first channel 541 for fuel to flow in, and the non-filtering-side contaminant accommodation cavity 53 communicates with the first channel 541; and the secondary filter body 6 is installed on one side of the primary filter body 5, is connected to the upper cover plate 54 and the lower cover plate 55 and is configured to block water and allow the fuel to pass, and the secondary filter body 6 is formed with a second channel 61 for the fuel to flow out from the secondary filter body to an engine. It should be noted that the upper cover plate 54 and the lower cover plate 55 are respectively connected to openings in an upper side and a lower side of the porous frame 4, the particulate filter medium 52 is filter paper, and the particulate filter medium 52 has an inner side as a non-filtering side and an outer side as a filtering side. The fuel enters the first channel 541 from a fuel tank, then enters the non-filtering-side contaminant accommodation cavity 53, is filtered out to the filtering side of the particulate filter medium 52 after impurities are intercepted through the non-filtering side of the particulate filter medium 52, is filled in the filter assembly, and finally is pumped into the engine via the second channel 61 after the water is blocked by the secondary filter body 6.

In the technical solution of the present application, the primary filter body 5 and the secondary filter body 6 are arranged in the filter chamber of the assembly, and the particulate filter medium 52 of the primary filter body 5 is shaped by the support fence 51 and upper and lower end covers to be formed with the non-filtering-side contaminant accommodation cavity 53. During filtration, the fuel enters the non-filtering-side contaminant accommodation cavity 53 from the first channel connected to the outside to complete the filtration of particulate contaminants of the fuel; and after the fuel enters the secondary filter body 6, the water is intercepted by means of a water blocking medium 62 and is naturally sedimented in the fuel to complete the separation of the water in the fuel, and finally clean fuel is fed into an injection system for the engine.

The filter device 100B in the present application can make it possible to arrange more particulate filter media 52 in a limited space to increase its effective filtration area. The increase of the effective filtration area may reduce the flow rate per unit area of the fuel passing through a filter element and reduce the resistance of the fuel passing through the filter element (reduce energy consumption), such that the efficiency of particulate filtration is improved and more particulate impurities can be accommodated. Meanwhile, the reduction of the flow rate per unit area of the fuel passing through the filter element is conducive to the gathering of the water in the fuel, thereby improving the fuel-water separation efficiency of the filter element, and achieving the effect of improving and prolonging the filtration capacity and service life of the filter element per unit volume.

Figure 10:
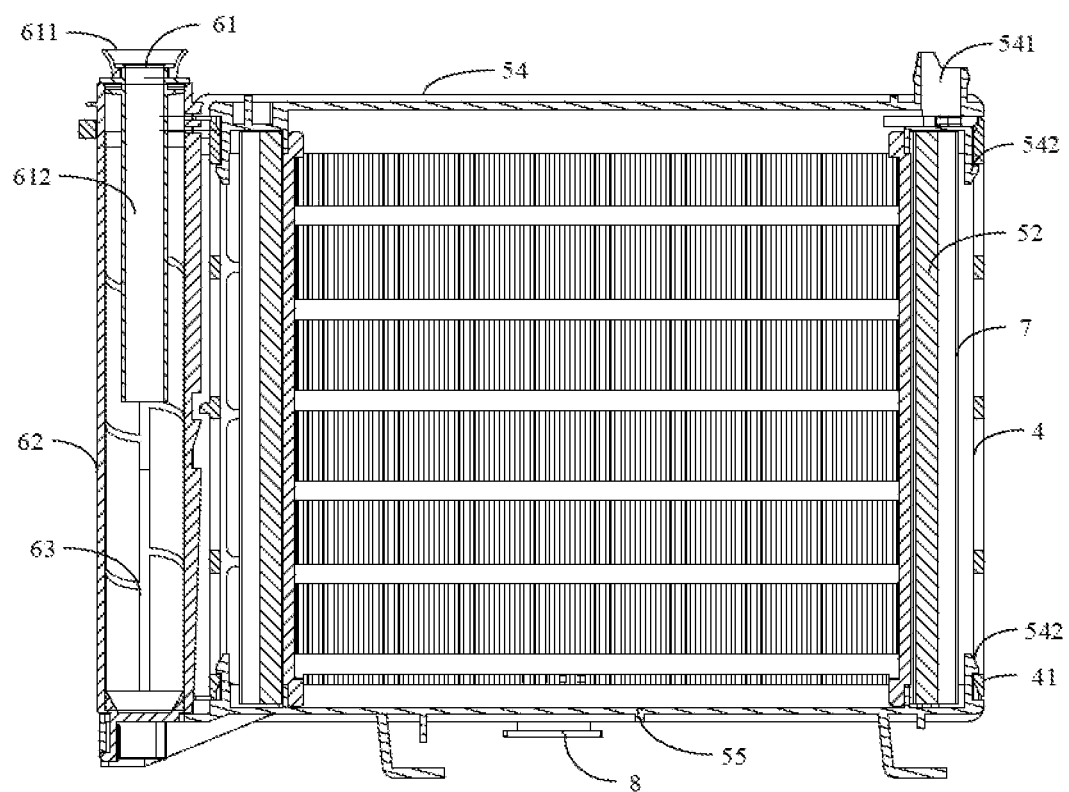
FIG. 10 is a cross-sectional view of the embodiment 100B of the filter device provided by the present application.
Figure 16:
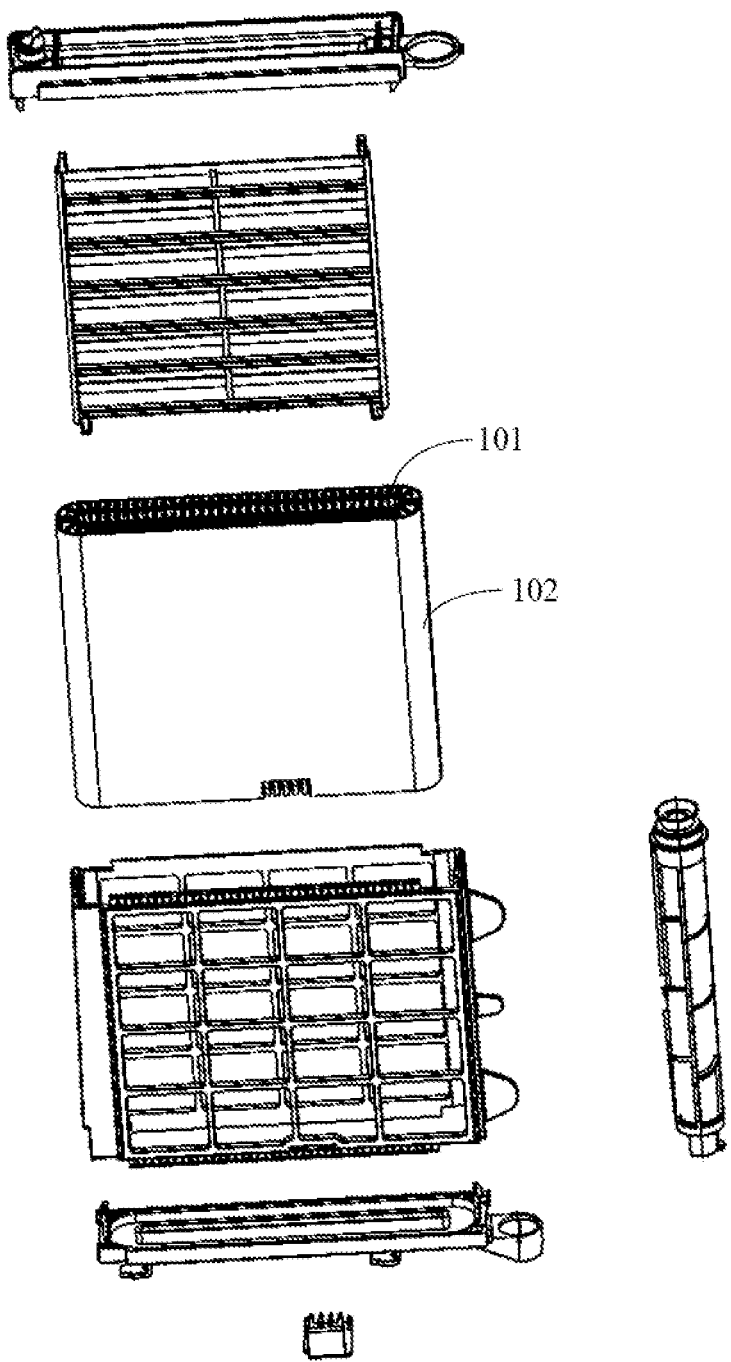
FIG. 16 is an exploded view of an embodiment 100C of the filter device provided by the present application.

Further, referring to FIGS. 10 and 11, in an embodiment of the present application, the filter device 100B further includes a water gathering medium 7, the water gathering medium 7 is sleeved on the periphery of the particulate filter medium 52 and covers an outer side of the particulate filter medium 52, and the water gathering medium 7 can gather the water and sediment it to the bottom of the filter chamber of the assembly and can allow the fuel to pass. It should be noted that the water gathering medium 7 may be made of a non-woven fabric or other materials capable of absorbing the water, and openings in two sides of the water gathering medium 7 are fixed to the upper cover plate 54 and the lower cover plate 55. Of course, the embodiment of the present application is not limited thereto. Referring to FIG. 16 that shows another embodiment of the filter device provided by the present application, in a filter device 100C, a water gathering medium 102 is wound around an outer side of a particulate filter medium 101 and is fixed to the particulate filter medium 101 by its own tension only. In addition, the water gathering medium 7 may also be integrated with the porous frame 4 by injection molding inlaying and integral forming, welding, or gluing. Preferably, the injection molding inlaying and integral forming may be adopted to make its structure more compact, which will not be repeated in detail here.

It should be noted that two sides of the water gathering medium 7 are respectively hermetically connected to the upper cover plate 54 and the lower cover plate 55, that is to say, the openings in the two sides of the water gathering medium 7 are enclosed by the upper cover plate 54 and the lower cover plate 55. Specific sealing is hot melt welding, preferably ultrasonic welding. Such welding can enable the two sides of the water gathering medium 7 to be respectively fixedly connected to the upper cover plate 54 and the lower cover plate 55, and has a good sealing effect. Of course, the two sides of the water gathering medium 7 may also be respectively bonded to the upper cover plate 54 and the lower cover plate 55 by gluing.

Similarly, the two sides of the particulate filter medium 52 are respectively welded with the upper cover plate 54 and the lower cover plate 55 by hot melt. Such welding has a good sealing effect, such that the non-filtering-side contaminant accommodation cavity 53 is formed inside. Preferably, the hot melt welding is ultrasonic welding.

Figure 13:
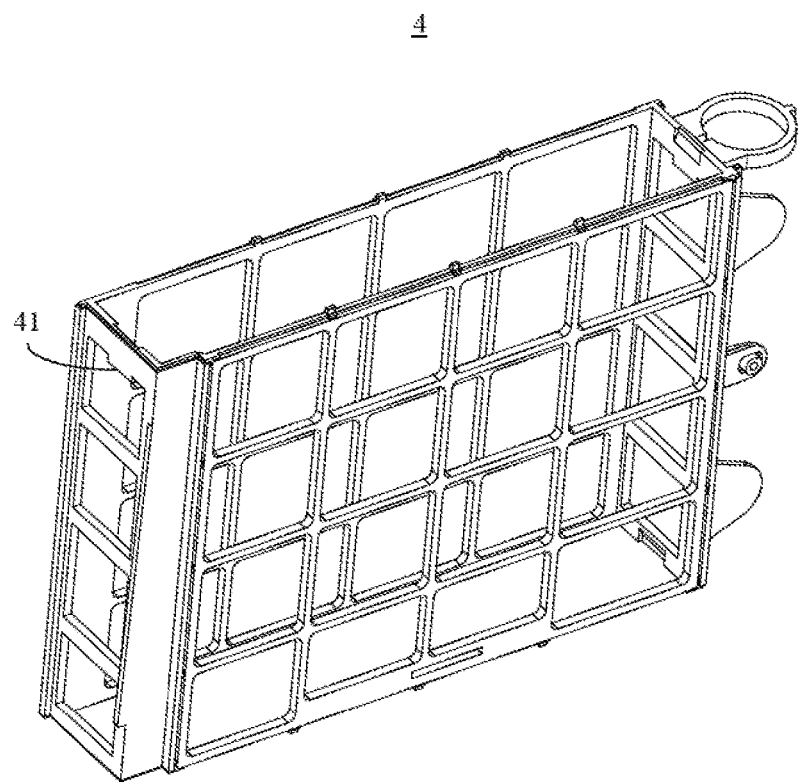
FIG. 13 is a three-dimensional structural diagram of a porous frame in FIG. 9.

Referring to FIG. 13, in some embodiments of the present application, the porous frame 4 is of a square structure and is formed with openings in two sides, and the porous frame 4 has at least one porous hollow surface and is hollow on four sides in this embodiment; and moreover, a manner of connecting the porous frame 4 to the upper cover plate 54 and the lower cover plate 55 includes one or a combination of hot melt welding, gluing, and clamping.

Figure 14:
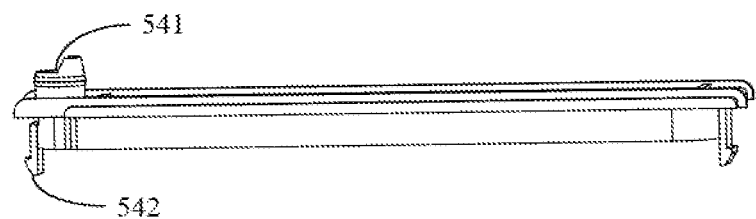
FIG. 14 is a three-dimensional structural diagram of an upper cover plate and a lower cover plate in FIG. 9.
Figure 14:
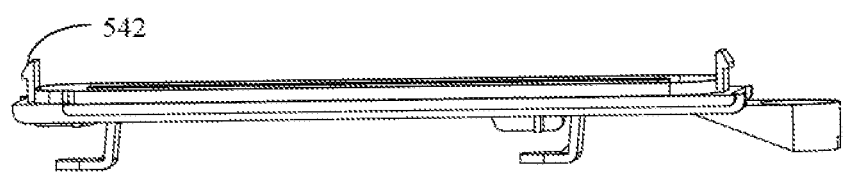

Referring to FIGS. 13 and 14, in this embodiment, hooks 542 are arranged on an edge of the upper cover plate 54 and an edge of the lower cover plate 55, the hooks 542 are arranged towards the openings of the porous frame 4 and are correspondingly clamped with fittings 41 on the porous frame 4 to fix the upper cover plate 54 and the lower cover plate 55 to the porous frame 4. The fittings 41 are arranged on leak holes in the side surfaces of the porous frame 4. Of course, the hooks 542 are internal hooks or external hooks in a clamping connection form. Not only that, a fixation manner of the above clamping connection may also be combined with a manner of gluing, hot melt welding, etc., which will not be repeated in detail here.

Referring to FIG. 10, the upper cover plate 54 and the lower cover plate 55 are respectively connected to openings in two ends of the particulate filter medium 52 by hot melt welding, and the support fence 51, in the non-filtering-side contaminant accommodation cavity 53, may also be welded with and abut against the end cover; and in view of that the particulate filter medium 52, that is, filter paper will become soft under long-time soaking to collapse, at this time the support fence 51 may play a supporting role.

In an embodiment of the present application, referring to FIG. 11, the support fence 51 is provided with a plurality of transverse ribs 511, and the transverse ribs 511 are staggered and spaced in a vertical direction. In this embodiment, the transverse ribs 511 are parallel to each other and have the same length, and the particulate filter medium 52 is expanded into a flat cuboid structure. Such structure enables the particulate filter medium 52 to have the maximum contact area in the limited non-filtering-side contaminant accommodation cavity 24. It should be noted that the support fence 51 is further provided with a plurality of vertical ribs 512 integrally formed with the transverse ribs 511, and the transverse ribs 511 are staggered and spaced on the vertical ribs 512 to form the support fence 51.

In an embodiment of the present application, referring to FIG. 11, ends of the transverse ribs 511 abut against the particulate filter medium 52 to form the non-filtering-side contaminant accommodation cavity 53. The entered fuel diffuses into the cavity. Of course, the embodiment of the present application is not limited thereto. In other embodiments, the transverse ribs 511 on the support fence 51 may also be intersected with each other, and the particulate filter medium 52 may also be expanded into the cuboid structure.

Figure 15:
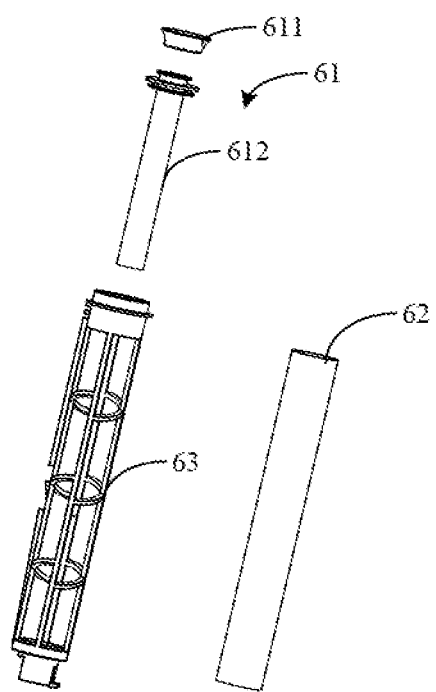
FIG. 15 is an exploded view of a secondary filter body in FIG. 9.

In some embodiments of the present application, referring to FIG. 15, the secondary filter body 6 includes a tubular water blocking medium 62 and a tube frame 63, the water blocking medium 62 is fuel-water separation mesh cloth with characteristics of water repelling and fuel passing, the tube frame 63 and the water blocking medium 62 are integrally injection-molded, installation clamping pieces 42 are arranged on one side of the upper cover plate 54 and one side of the lower cover plate 55, and the tube frame 63 is installed on the installation clamping pieces 42. In this embodiment, the installation clamping pieces 42 are hoops, and installation clamping pieces 42 are further arranged on the side surfaces of the porous frame 4 to enhance the fixation of the secondary filter body 6. In addition, the second channel 61 communicates with the water blocking medium 62 to feed the water-free fuel into the engine, the second channel 61 includes a sealing sleeve 611 configured to be connected to the outside, and a fuel passing tube 612, the fuel passing tube 612 is arranged inside the water blocking medium 62 and is hermetically connected to the tube frame 63, and the sealing sleeve 611 is buckled to a fuel outlet of the fuel passing tube 612.

It should be noted that the multistage fuel filter device 100B is placed in the filter chamber (not shown in figure) of the assembly and is connected to it by the above first channel 11 and second channel 61, and the fuel is pumped into the engine after flowing out through the non-filtering-side contaminant accommodation cavity 24, the particulate filter medium 52, the water gathering medium 121, the secondary filter body 6, and the second channel 61 connected to the filter chamber of the assembly in sequence from the first channel 11 connected to the filter chamber of the assembly.

In addition, the filter chamber of the assembly is provided with a ground wire for conducting static electricity and a water level sensor. The ground wire is electrically connected to an electrical connector 8 on the lower cover plate 55 to conduct the static electricity generated in the particulate filter medium 52 by the fuel to the outside. Of course, the lower cover plate 55 is made of a conductive material. In addition, the filter chamber of the assembly is further provided with a valve for drainage, and the valve is interlocked with the water level sensor, such that when the water in the fuel is sedimented to a certain height, a drainage alarm is given for drainage.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in detail, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. A filter device, comprising:
   a housing formed with a first channel for fuel to flow in and two side surfaces of the housing are symmetrically arranged hollow surfaces;
   a primary filter body installed inside the housing, the primary filter body comprising a support fence, a particulate filter medium sleeved on the periphery of the support fence, and end covers connected to two ends of the particulate filter medium, and being formed with a non-filtering-side contaminant accommodation cavity, the non-filtering-side contaminant accommodation cavity communicating with the first channel, and the primary filter body forming a filtering-side cleaning cavity together with the housing; and
   a secondary filter body installed on an outer side of the housing and configured to block water and allow the fuel to pass, the secondary filter body being formed with a second channel for the fuel to flow out from the secondary filter body;
   wherein each of the hollow surfaces is provided with a water gathering medium, the water gathering medium covers the hollow surface and encloses a hollow portion of the hollow surface, and the water gathering medium can gather the water and sediment it to the bottom of a filter chamber of an assembly and can also filter out the fuel in the filtering-side cleaning cavity; and wherein the support fence is provided with a plurality of transverse ribs, and the transverse ribs are staggered and spaced in a vertical direction, and the particulate filter medium is expanded into a cuboid structure.

2. The filter device according to claim 1, wherein the housing comprises a cover plate and a base, the base is formed with an opening, and the opening is enclosed by the cover plate.

3. The filter device according to claim 2, wherein the hollow surfaces are arranged on the cover plate and the base; and each of the hollow surfaces is inlaid with and covered by the water gathering medium for gathering the water and filtering out the fuel in the filtering-side cleaning cavity.

4. The filter device according to claim 2, wherein one end cover of the primary filter body is formed with a fuel passing hole communicating with the first channel.

5. The filter device according to claim 2, wherein an enclosing manner of the cover plate and the base comprises one or a combination of welding, gluing, fastening, and clamping.

6. The filter device according to claim 2, wherein a buckle is arranged on an edge of the cover plate, the opening of the base is provided with a fastener, and the buckle is correspondingly clamped with the fastener to enclose the cover plate on the base.

7. The filter device according to claim 1, wherein the secondary filter body comprises a tubular water blocking medium and a tube frame for fixing the water blocking medium, and the tube frame is installed on an installation clamping piece on one side of the housing.

* * * * *